United States Patent
Zheng

(10) Patent No.: US 8,312,284 B1
(45) Date of Patent: Nov. 13, 2012

(54) VERIFIABLE TIMESTAMPING OF DATA OBJECTS, AND APPLICATIONS THEREOF

(75) Inventor: Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 351 days.

(21) Appl. No.: 12/613,895

(22) Filed: Nov. 6, 2009

(51) Int. Cl.
 *H04L 9/32* (2006.01)
(52) U.S. Cl. ........................................ 713/178; 713/194
(58) Field of Classification Search .................. 713/178, 713/194
 See application file for complete search history.

(56) References Cited

U.S. PATENT DOCUMENTS

| | | | |
|---|---|---|---|
| 6,188,766 B1 | 2/2001 | Kocher | |
| 6,587,945 B1* | 7/2003 | Pasieka | 713/176 |
| 6,898,709 B1 | 5/2005 | Teppler | |
| 2003/0159048 A1* | 8/2003 | Matsumoto et al. | 713/178 |
| 2007/0106912 A1* | 5/2007 | Tanaka | 713/193 |
| 2007/0147610 A1* | 6/2007 | Kethi Reddy | 380/229 |
| 2007/0214363 A1* | 9/2007 | Ishii | 713/178 |
| 2007/0276862 A1* | 11/2007 | Toutonghi | 707/103 X |
| 2008/0288779 A1* | 11/2008 | Zhang et al. | 713/178 |
| 2011/0055590 A1* | 3/2011 | Lee et al. | 713/189 |

OTHER PUBLICATIONS

Bayer, D., et al., "Improving the Efficiency and Reliability of Digital Time-Stamping", *Sequences II: Methods in Communication, Security, and Computer Science*, 1993, Springer-Verlag, New York, 6 pgs.

* cited by examiner

*Primary Examiner* — Jeffrey Pwu
*Assistant Examiner* — Jayesh Jhaveri
(74) *Attorney, Agent, or Firm* — Holland & Knight LLP; Brian J. Colandreo, Esq.

(57) ABSTRACT

This invention relates to creating a verifiable timestamp for a data object, such as a digital photograph. The verifiable timestamp includes a first and second timestamp and a data object. The verifiable timestamp enveloped with several different tiers of digital signatures that together authenticate that the data object was created at a time after the first timestamp, but before the second timestamp.

19 Claims, 3 Drawing Sheets

VERIFIABLE TIMESTAMPING OF DATA OBJECTS, AND APPLICATIONS THEREOF

BACKGROUND

1. Field of the Invention

This invention generally relates to timestamping data objects.

2. Related Art

Digital cameras are increasingly available. Many mobile phones are now equipped with a digital camera. Due to the wide availability of digital cameras on mobile phones, images taken from phones are often used in investigative journalism and in judicial proceedings. The photographic image files produced by mobile phone cameras include a timestamp to record the time that the camera takes a photo. However, this timestamp may be easily tampered with. The risk that a timestamp may have been altered draws into question its authenticity.

Systems and methods are needed to generate more secure timestamps for data objects, such as digital photographs.

BRIEF SUMMARY

Embodiments of this invention relate to creating a verifiable timestamp for a data object, such as a digital photograph. In a first embodiment, a method generates a verifiable timestamp for creation of a data object on a computing device. In the method, a first timestamp is received from a remote server. The first timestamp is digitally signed using a first private key of a first trusted authority and indicates a present time at the creation of the first timestamp. After the receiving the first timestamp, a data object is created. On the computing device, a tuple comprising the data object and the digitally signed first timestamp is digitally signed using a second private key of a second trusted authority. The digitally signed tuple is sent to the remote server. From the remote server, a verifiable timestamp comprising the digitally signed tuple and a second timestamp is received. The second timestamp indicates a present time at the creation of the second timestamp after creation of the data object. The verifiable timestamp is digitally signed using the first private key of the first trusted authority. The verifiable timestamp securely indicates that the data object was created after the first timestamp and before the second timestamp.

In a second embodiment, a system generates a verifiable timestamp for a data object. The system includes a timestamp requester module that receives, from a remote server, a first timestamp indicating the present time digitally signed using a first private key of a first trusted authority. A capture module creates a data object after the first timestamp is received by the timestamp requester module. A signer module digitally signs a tuple comprising the data object and the digitally signed first timestamp using a second private key of a second trusted authority. The timestamp requester module sends the digitally signed tuple to the remote server and receives, from the remote server, a verifiable timestamp comprising the digitally signed tuple and a second timestamp. The second timestamp indicates a present time at the creation of the second timestamp after creation of the data object. The verifiable timestamp is digitally signed using the first private key of the first trusted authority. The verifiable timestamp securely indicates that the data object was created after the first timestamp and before the second timestamp.

In a third embodiment, a method determines a verifiable timestamp for a data object. In the method, a first request for a timestamp is received from the mobile device. In response to the first request, a first timestamp is determined. The first timestamp is digitally signed using a first private key of a first trusted authority. The digitally signed first timestamp is sent to the mobile device. From the mobile device, a second request is received. The second request comprises a digitally signed tuple comprising a data object created after the first timestamp is sent and the digitally signed first timestamp. The tuple is digitally signed using a second private key of a second trusted authority. A verifiable timestamp is determined including the digitally signed tuple and a second timestamp indicating the present time. The verifiable timestamp is digitally signed using the first private key of the first trusted authority. The verifiable timestamp securely indicates that the data object was created after the first timestamp and before the second timestamp.

In a fourth embodiment, a method verifies a time when a data object was created. In the method, a digital signature of a verifiable timestamp is authenticated using a first public key of a first trusted authority. The verifiable timestamp has been digitally signed using a first private key of the first trusted authority. The verifiable timestamp includes a tuple digitally signed using a second private key of a second trusted authority. The tuple includes the data object and a first timestamp digitally signed using the first private key of the first trusted authority and a second timestamp. A digital signature of the tuple is authenticated using a second public key of the second trusted authority. A digital signature of the first timestamp is authenticated using the first public key of the first trusted authority. In this way, the time the data object was created is verified to be after the first timestamp and before the second timestamp.

Further embodiments, features, and advantages of the invention, as well as the structure and operation of the various embodiments are described in detail below with reference to accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Embodiments of this invention relate to creating a verifiable timestamp for a data object, such as a digital photograph. The verifiable timestamp includes a first and second timestamp and a data object. The verifiable timestamp is enveloped with several different tiers of digital signatures that together authenticate that the data object was created at a time after the first timestamp, but before the second timestamp.

Figure 1:
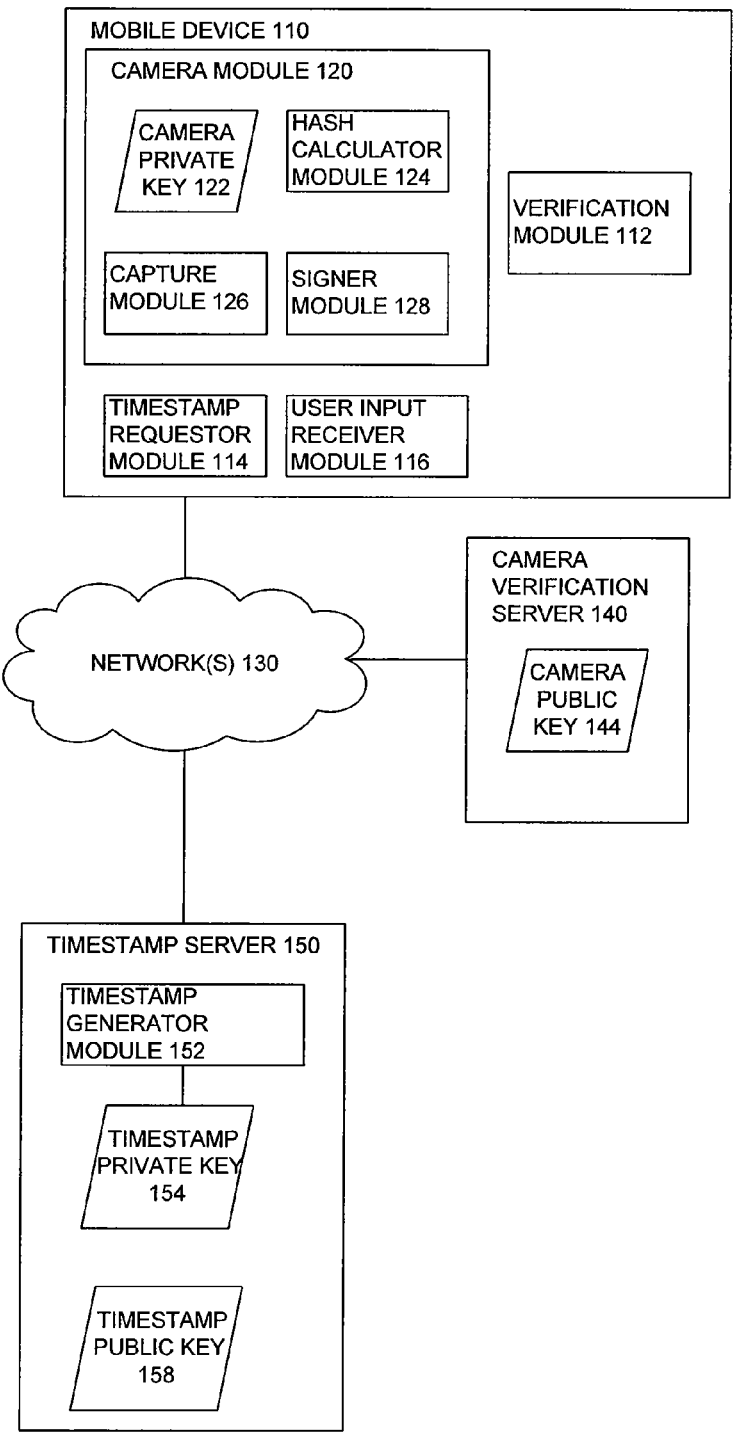
FIG. 1 is a diagram showing a system for generating and authenticating a verifiable timestamp according to an embodiment of the present invention.

FIG. 1 is a diagram showing a system 100 for generating and authenticating a verifiable timestamp according to an embodiment of the present invention. System 100 includes a mobile device 110, a verification server 140, and a timestamp server 150 coupled to one or more networks 130, such as the Internet.

Mobile device 110 includes a timestamp requestor module 114, a user input receiver module 116, a verification module 112, and a camera module 120. Camera module 120 includes a camera private key 122, a hash calculator module 124, a capture module 126, and a photo signer module 128.

In general, mobile device 110 may operate as follows to generate a verifiable timestamp. User input receiver module 116 receives an input to take a photograph. Prior to capturing the photograph, timestamp requestor module 114 requests a signed first timestamp from timestamp server 150. In response to the request, timestamp requestor module 114 receives the digitally signed first timestamp and sends it onto camera module 120. In camera module 120, capture module 126 takes the photograph. Hash calculator module 124 determines a hash value of the photograph, and photo signer module 116 signs the combination of the hash value and digitally signed first timestamp. Finally, timestamp requestor module 114 requests that timestamp server 150 generate a second timestamp and digitally sign the second timestamp and the digitally signed combination of the hash value and digitally signed first timestamp to create the verifiable timestamp. Each of the components and their functionality is described in greater detail below.

User input receiver module 116 is configured to receive an input to take a photograph. In an embodiment, the input may be a user input received in response to a user action, such as depressing a button on mobile device 110.

Once user input receiver module 116 receives an input to take a photograph, timestamp requestor module 114 requests a signed first timestamp from timestamp server 150 via network(s) 130. Timestamp server 150 includes a timestamp generator module 152 that generates the timestamp.

The first timestamp records a time prior to capturing the photograph. In an example, timestamp server 150 may receive a request using an HTTP request, such as a web service request. Alternatively, timestamp server 150 may receive requests via short message service (SMS). Timestamp generator module 152 may be a server configured to receive an input (X), generate a timestamp representing the current time (t) and digitally sign the combination $\{X, t\}_T$ with a timestamp private key 154. As used herein, subscripts indicate a digital signature. For example, the notation $\{X, t\}_T$ indicates that the tuple $\{X, t\}$ has been digitally signed with the private key T. Timestamp server 150 may be a trusted authority to provide a genuine time. In the case where timestamp requestor module 114 only requests a signed timestamp, the input X may be a null value.

In an example, data, such as the timestamp t, may be digitally signed, by encrypting the data with a private key. In another example, data may be digitally signed by determining a hash value of the data and encrypting the hash value. Other methods of digitally signing data may be used as would be known to those of skill in the art.

Once timestamp requester module 114 receives the signed first timestamp, timestamp requester module 114 is configured to send the signed first timestamp to camera module 120. In an embodiment, camera module 120 may be implemented in a tamper-proof or tamper-resistant medium. For example, camera module 120 may be implemented in firmware. The firmware may be constructed such that an attempt to modify the firmware would destroy it. A tamper-proof construction provides assurance that an individual could not forge the digital signature of the combination of a hash value of a photo and a signed timestamp. In other words, an individual cannot forge the evidence that a photo is taken after a certain time.

Once camera module 120 receives the signed first timestamp, capture module 126 may capture a photograph. Capturing a photograph may involve sending a signal to expose or readout an image sensor, such as a CCD or CMOS image sensor. Although system 100 is described with respect to creating a photograph, a person of skill in the art would recognize that system 100 may be used to create verifiable timestamps for other data objects as well. For example, a capture module 126 that may create a video or audio file, a web page, email, or other data being captured.

Hash calculator module 124 may determine a hash value of the photograph captured by capture module. Hash calculator module 124 may, for example, use a SHA1 algorithm to determine the hash value. As discussed below, the hash value is used to identify the photograph or other data object in the verifiable timestamp. By reducing the data object to a hash value, hash calculator module 124 avoids incorporating the entire data object into the timestamp. However, in cases where the data object is small, determining a hash value may prove unnecessary.

Signer module 128 is configured to digitally sign a tuple including the digitally signed first timestamp and a data object or a unique fingerprint (such as a hash value) of a data object. In an embodiment, signer module 128 may sign the data object generated by capture module 126. In another embodiment, signer module 128 may sign the hash value generated by hash calculator module 124. Signer module 128 may use camera private key 122 to digitally sign the tuple. Camera private key 122 may be issued by a trusted authority, such as the manufacturer of the module device 110 or camera module 120. By digitally signing the tuple, signer module 128 certifies that the data object was created after the first timestamp was received. This signature assures that the first timestamp in the verifiable timestamp represents a time before the data object was created.

Finally, timestamp server 150 may send the digitally signed tuple to timestamp server 150 to generate the verifiable timestamp. Timestamp generator module 152 generates a second timestamp indicating the present time and creates the verifiable timestamp. The verifiable timestamp includes the combination of the second timestamp and the digitally signed tuple. The verifiable timestamp is itself digitally signed with timestamp private key 154. The digital signature of the verifiable timestamp assures that the second timestamp was created after the timestamp generator module 152 received the tuple that includes the data object. Effectively, the digital signature assures that the second timestamp was created after the data object.

Timestamp server 150 may send the verifiable timestamp back to mobile device 110 where it is stored along with its corresponding digital object. In an embodiment, the verifiable timestamp may be stored in a metadata header of a digital object. In an example, the verifiable timestamp may be stored in an EXIF header of a digital photograph, such as a JPEG or TIFF file.

As mentioned above, the verifiable timestamp indicates that the data object was created at a time in between the first and second timestamp. The hash value identifies the data object and the series of enveloped digital signatures authenticate the verifiable timestamp to ensure that no component of the verifiable timestamp has been created fraudulently. More detail on creating the verifiable timestamp is provided below with respect to FIG. 2.

Verification module 112 is configured to interpret and authenticate a verifiable timestamp. While verification module 112 is shown on mobile device 110, a person of skill in the art would recognize that verification module 112 may be included on any computing device configured to authenticate a verifiable timestamp. Verification module 112 may also be implemented, for example, as a secure web service so many computing devices can access it over a network.

Verification module 112 is configured to extract the first timestamp, the second timestamp, and the data object from the verifiable timestamp. If the data object represents a hash value of another data object, such as a digital photograph, then verification module 112 may determine the hash value of the other data object. In this way, verification module 112 verifies that the verifiable timestamp actually corresponds to that other data object.

To authenticate the digital signatures, verification module 112 may use a camera public key 144 and a timestamp public key 158. In system 100, camera public key 144 and timestamp public key 158 are published on timestamp server 150 and camera verification server 140 respectively. However, a person of skill in the art would recognize that camera public key 144 and timestamp public key 158 may be available in other locations as well. Verification module 112 may retrieve camera public key 144 from timestamp server 140 to authenticate the digital signature generated by signer module 128 and may retrieve timestamp public key 158 from camera verification server 140 to authenticate digital signatures generated by timestamp generator module 152.

In an embodiment, timestamp public key 158 or camera public key 144 may be signed by a trusted certificate authority (CA) (not shown), such as a VeriSign certificate authority. In this embodiment, verification module 112 may authenticate the public keys using a public key available from the trusted certificate authority. In this way, verification module 112 can verify that timestamp public key 158 and camera public key 144 correspond to the timestamp trusted authority and camera module respectively. In different embodiments, a camera manufacturer may either create a private/public key pair for each camera module or uses its own public/private key pair. More detail on how verification module 112 may operate to authenticate the verifiable timestamp is provided below with respect to FIG. 3.

Each of camera module 120, hash calculator module 124, capture module 126, signer module 128, verification module 112, timestamp requester module 114, user input receiver module 116, and timestamp generator module 152 may be implemented in hardware, software, firmware or any combination thereof.

Mobile device 110 may be any type of mobile device including, but not limited to, a cell phone, Personal Digital Assistant (PDA), smart phone, digital camera, video camera, GPS device, or media player.

Each of timestamp server 150 and camera verification server 140 may be implemented on any type of computing device. Such computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

Figure 2:
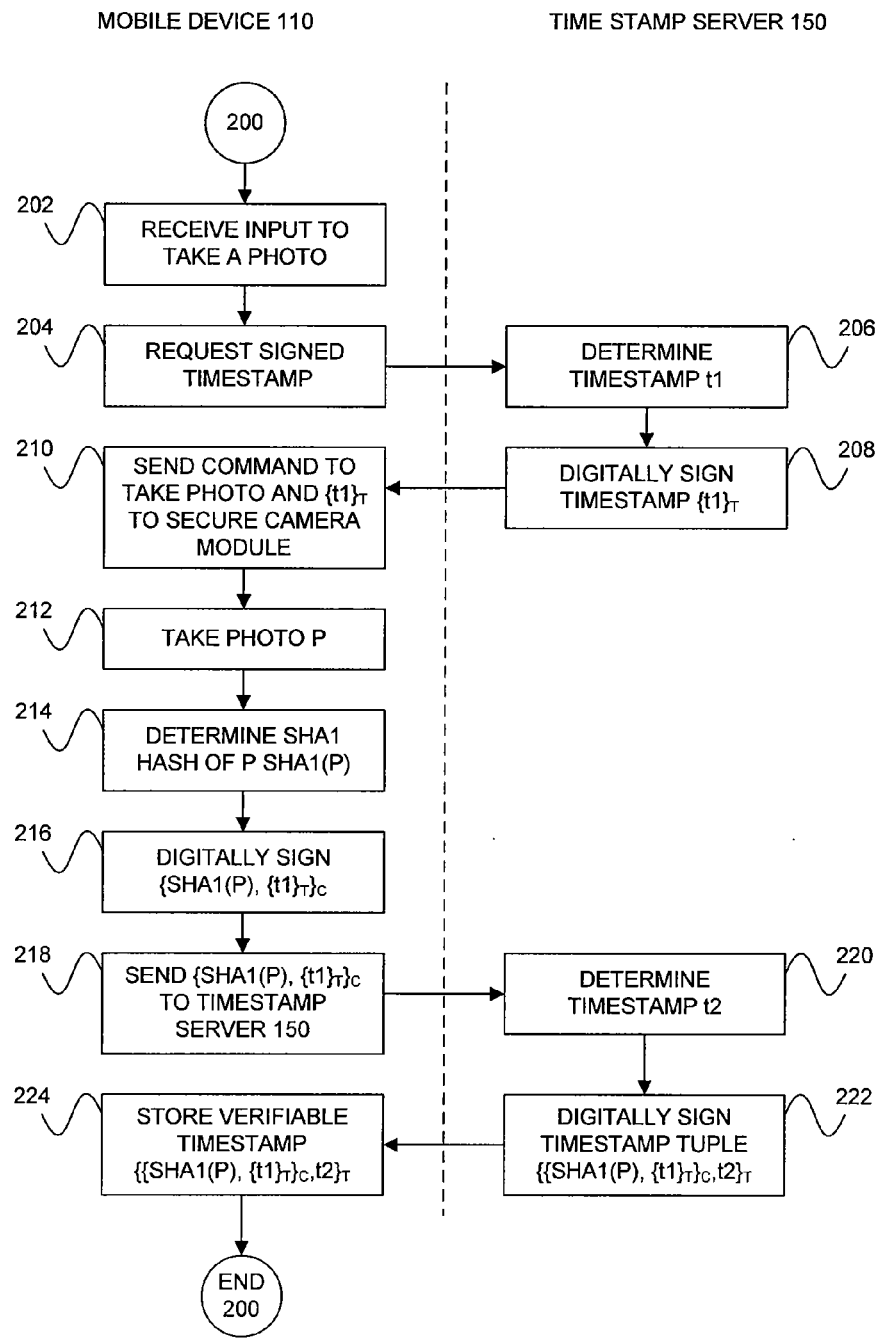
FIG. 2 is a flowchart showing a method for generating a verifiable timestamp according to an embodiment of the present invention, which may be used in operation of the system in FIG. 1.

FIG. 2 is a flowchart showing a method 200 for generating a verifiable timestamp according to an embodiment. Method 200 is described for clarity with respect to components in system 100 of FIG. 1. However, method 200 is not limited thereto. A person of skill in the art would recognize other applications of method 200 in different environments.

Method 200 begins with mobile device 110 receiving an input to take a photo at step 202. At step 204, mobile device 110 requests a signed timestamp from timestamp server 150. As mentioned above, the request may be, for example, packaged in an HTTP request or SMS message.

In response to the request, timestamp server 150 determines a timestamp t1 representing the present time at step 206. At step 208, timestamp server 150 digitally signs timestamp t1 using a private key T of timestamp server 150, generating $\{t1\}_T$. The digital signature enables verification of the fact that t1 was generated by timestamp server 150. Then, timestamp server 150 sends the digitally signed timestamp $\{t1\}_T$ to mobile device 110.

When mobile device 110 receives $\{t1\}_T$, it sends $\{t1\}_T$ to a secure camera module along with a command to take a photo at step 210. As described above, the secure camera module may be implemented in a tamper-proof or tamper resistant medium. At step 210, mobile device 110 captures a photograph P. Although method 200 is described with respect to taking a photograph, a person of skill in the art would recognize that method 200 is applicable to other types of data objects, such as audio and video files. At step 214, a hash value of photo P is determined using a SHA1 algorithm to create SHA1(P). The hash value SHA1(P) identifies that the verifiable timestamp corresponds to photo P without having to include photo P in its entirety in the verifiable timestamp.

At step 216, mobile device 110 digitally signs a tuple including SHA1(P) and $\{t1\}_T$ using a private key C of the camera manufacturer, generating $\{SHA1(P), \{t1\}_T\}_C$. The digital signature authenticates that P and SHA1(P) were created by a secure camera module and accordingly assures that P was captured after the secure camera module received the timestamp $\{t1\}_T$. At step 218, mobile device 110 sends $\{SHA1(P), \{t1\}_T\}_C$ to timestamp server 150 to request a verifiable timestamp.

In response to the request, timestamp server 150 determines a timestamp t2 indicating the present time at step 220. In step 222, timestamp server 150 digitally signs the combination of the timestamp t2 and the digitally signed tuple $\{SHA1(P), \{t1\}_T\}_C$ to generate the verifiable timestamp $\{\{SHA1(P), \{t1\}_T\}_C, t2\}_T$. The digital signature enables verification of the fact that t2 was generated by timestamp server 150 and assures that t2 was created after receipt of the digitally signed tuple $\{SHA1(P), \{t1\}_T\}_C$. Effectively, the digital signature assures that t2 was created after creation of photo P. Then, timestamp server 150 sends the verifiable timestamp $\{\{SHA1(P), \{t1\}_T\}_C, t2\}_T$ to mobile device 110.

Finally, at step 224, mobile device 110 stores the verifiable timestamp $\{\{SHA1(P), \{t1\}_T\}_C, t2\}_T$ along with the photo P. In this way, method 200 creates a verifiable record of when photo P was created.

Figure 3:
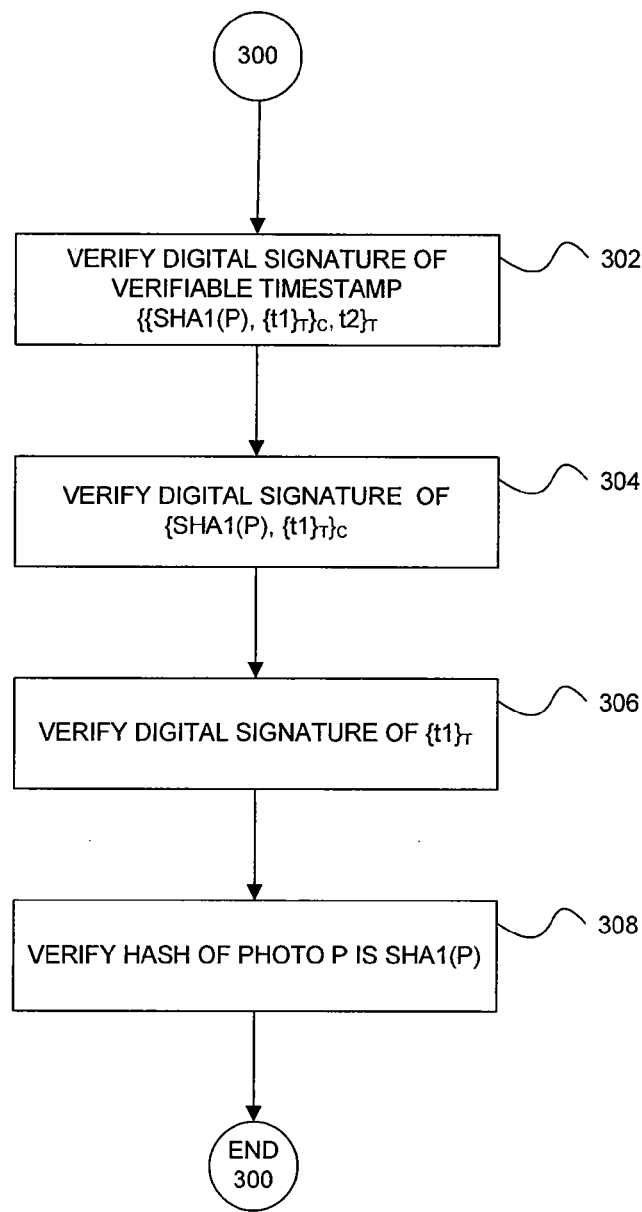
FIG. 3 is a flowchart showing a method for authenticating a verifiable timestamp according to an embodiment of the present invention, which may be used in operation of the system in FIG. 1.

FIG. 3 is a flowchart showing a method 300 for authenticating a verifiable timestamp according to an embodiment. In one example, method 300 may be used in operation of verification module 112 of FIG. 1.

At step 302, a digital signature of the verifiable timestamp $\{\{SHA1(P), \{t1\}_T\}_C, t2\}_T$ is verified. Step 302 may include decrypting the verifiable timestamp {{SHA1(P), {t1}$_T$}$_C$, t2}$_T$ (or a hash of the verifiable timestamp) with a public key associated with the timestamp server. As mentioned above, the public key of the timestamp server may further be digitally signed by a certificate authority, such as a VeriSign certificate authority. In that case, digital signature the public key may be verified against a public key of the certificate authority. The verification of step 302 assures that t2 was generated by the timestamp server after it received {SHA1(P), {t1}$_T$}$_C$ from the mobile device.

At step 304, a digital signature of the tuple is {SHA1(P), {t1}$_T$}$_C$ is verified. Step 304 may include decrypting the tuple {SHA1(P), {t1}$_T$}$_C$ (or a hash of the verifiable tuple, depending on how the tuple is digitally signed) with a public key associated with the camera manufacturer. As mentioned above, the public key of the camera manufacturer may further be digitally signed by a certificate authority, such as a VeriSign certificate authority. In that case, digital signature the public key may be verified against a public key of the certificate authority. The verification of step 304 assures that the photo P was captured by the camera module after it received {t1}$_T$.

At step 306, the digital signature of the first timestamp {t1}$_T$ is verified. Step 306 may include decrypting the timestamp {t1}$_T$ (or a hash of the timestamp, depending on how the timestamp is digitally signed) with a public key associated with the timestamp server. As mentioned above, the public key of the timestamp server may be verified against a public key of a certificate authority. The verification of step 306 assures that the first timestamp {t1}$_T$ was created by the timestamp server.

At step 308, the hash of photo P (i.e., SHA1(P)) is verified. Step 308 may include determining a hash value of photo P using a SHA1 algorithm, and verifying that the hash value equals the SHA1(P) value stored in the verifiable timestamp. The verification of step 308 assures that the verifiable timestamp corresponds to the photo P.

By verifying a series of enveloped digital signatures, method 300 ensures that photo P was taken at a time after t1 and before t2.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for generating a verifiable timestamp for a data object on a computing device, comprising:
    receiving, from a remote server, a first timestamp digitally signed using a first private key of a first trusted authority, wherein the first timestamp indicates a first time, the first time being a present time at creation of the first timestamp;
    creating a data object in response to receiving the first timestamp;
    digitally signing, on the computing device, a tuple comprising the data object and the digitally-signed first timestamp, by using a second private key of a second trusted authority;
    sending the digitally-signed tuple to the remote server; and
    receiving, from the remote server, a verifiable timestamp comprising the digitally-signed tuple and a second timestamp, the verifiable timestamp being digitally signed using the first private key of the first trusted authority, wherein the second timestamp indicates a second time, the second time being a present time at creation of the second timestamp occurring after creation of the data object,
    whereby the verifiable timestamp securely indicates that the data object was created after the first timestamp and before the second timestamp.

2. The method of claim 1, wherein the creating comprises taking a digital photograph.

3. The method of claim 2, wherein the creating further comprises determining a hash value of the digital photograph.

4. The method of claim 1, wherein the computing device is a mobile device.

5. The method of claim 4, wherein the receiving the first timestamp comprises receiving the first timestamp from the remote server via short message service,
    wherein the sending comprises sending the tuple to the remote server via short message service, and
    wherein the receiving the verifiable timestamp comprises receiving the verifiable timestamp from the remote server via a short message service.

6. The method of claim 1, wherein the digitally signing comprises determining the digital signature using a tamper-proof module on the computing device.

7. A system for generating a verifiable timestamp for a data object, comprising:
    a timestamp requester module that receives, from a remote server, a first timestamp digitally signed using a first private key of a first trusted authority, wherein the first timestamp indicates a first time, the first time being a present time at creation of the first timestamp;
    a capture module that creates a data object in response to the first timestamp being received by the timestamp requester module; and
    a signer module that digitally signs a tuple comprising the data object and the digitally-signed first timestamp by using a second private key of a second trusted authority,
    wherein the timestamp requester module sends the digitally-signed tuple to the remote server and receives, from the remote server, a verifiable timestamp comprising the digitally-signed tuple and a second timestamp indicating the first time, the verifiable timestamp being digitally signed using the first private key of the first trusted authority, whereby the verifiable timestamp securely indicates that the data object was created after the first timestamp and before the second timestamp, wherein the timestamp requester module, capture module, and signer module are implemented on a computing device.

8. The system of claim 7, wherein the capture module takes a digital photograph.

9. The system of claim 8, wherein the capture module comprises:

a hash calculator module that determines a hash value of the digital photograph, wherein the data object is the hash value.

10. The system of claim 7, wherein the computing device is a mobile device.

11. The system of claim 7, wherein the timestamp requester module communicates with the remote server via a short message service.

12. The system of claim 7, wherein the signer module is implemented on a tamper-proof medium.

13. A computer-implemented method for determining a verifiable timestamp for a data object and carried out by a computing device, comprising:

receiving, from a mobile device, a first request for a timestamp;

in response to the first request, determining a first timestamp indicating a first time, the first time being a present time at determination of the first timestamp;

digitally signing the first timestamp using a first private key of a first trusted authority;

sending the digitally-signed first timestamp to the mobile device;

receiving, from the mobile device, a second request, the second request comprising a digitally-signed tuple comprising a data object created in response to the sending of the digitally-signed first timestamp, the tuple being digitally signed using a second private key of a second trusted authority; and determining a verifiable timestamp comprising the digitally-signed tuple and a second timestamp indicating a second time, the second time being a present time at determination of the second timestamp, the verifiable timestamp being digitally signed using the first private key of the first trusted authority, whereby the verifiable timestamp securely indicates that the data object was created after the first timestamp and before the second timestamp.

14. The method of claim 13, wherein the data object is a hash value of a digital photograph.

15. The method of claim 13, further comprising:

sending the determined verifiable timestamp to the mobile device.

16. The method of claim 15, wherein the receiving the first request comprises receiving the first request from the mobile device via short message service, wherein the sending comprises sending the digitally-signed first timestamp to the mobile device via short message service, wherein the receiving the second request comprises receiving the second request from the mobile device via short message service.

17. A computer-implemented method carried out by a computing device for verifying a time when a data object was created, comprising:

authenticating a digital signature of a verifiable timestamp using a first public key of a first trusted authority, the verifiable timestamp signed using a first private key of the first trusted authority and comprising:

a tuple digitally signed using a second private key of a second trusted authority, comprising the data object and a first timestamp digitally signed using the first private key of the first trusted authority, wherein the data object is created in response to receiving the first time stamp, and a second timestamp created after creation of the data object;

authenticating a digital signature of the tuple using a second public key of the second trusted authority; and authenticating a digital signature of the first timestamp using the first public key of the first trusted authority, whereby the time the data object was created is verified to be after the first timestamp and before the second timestamp.

18. The method of claim 17, further comprising:

determining a hash value of a digital photograph; and verifying that the hash value of the digital photograph matches the data object.

19. A method for generating a verifiable timestamp on a computing device, comprising:

receiving, from a remote server, a first timestamp digitally signed using a first private key, wherein the first timestamp indicates a first time, the first time being a present time at creation of the first timestamp;

capturing a digital photograph in response to receiving the first timestamp;

digitally signing, on the computing device, a tuple comprising the digital photograph and the digitally-signed first timestamp using a second private key; and receiving, from the remote server, a verifiable timestamp comprising the digitally-signed tuple and a second timestamp, the verifiable timestamp being digitally signed using the first private key, wherein the second timestamp indicates a second time, the second time being a present time at creation of the second timestamp occurring after the capture of the digital photograph.

* * * * *